United States Patent

[11] 3,613,002

[72] Inventor George Trenkler
East Providence, R.I.
[21] Appl. No. 885,786
[22] Filed Dec. 17, 1969
[45] Patented Oct. 12, 1971
[73] Assignee Texas Instruments Incorporated
Dallas, Tex.

[54] COULOMETER AND TIMING APPARATUS
18 Claims, 8 Drawing Figs.
[52] U.S. Cl. .................................................. 324/182,
317/230, 324/94
[51] Int. Cl. .................................................. G04f 9/00
[50] Field of Search ........................................ 324/182,
94; 317/230

[56] References Cited
UNITED STATES PATENTS
929,371 7/1909 Arsem ........................ 317/230
3,344,343 9/1967 John ........................... 324/94 X
3,428,894 2/1969 Boettcher .................... 324/94

*Primary Examiner*—Alfred E. Smith
*Attorneys*—Harold Levine, Edward J. Connors, Jr., John A. Haug, James P. McAndrews and Gerald B. Epstein ABSTRACT: A reversible coulometer includes a pair of electrodes wherein each electrode alternates between functioning as an anode and as a cathode on alternate cycles. The coulometer includes a container and a liquid alkaline electrolyte in the container. A first electrode is in contact with the electrolyte and comprises an inert support and a solid active cadmium-containing material. A second control electrode comprises a liquid cadmium amalgam containing not more than about 1 percent cadmium by weight, the second electrode having an electrochemical energy storing capacity corresponding to about 1 percent of the capacity of the first electrode. A layer of dielectric material, permeable by the electrolyte and impermeable by the amalgam is in contact with the electrolyte and the amalgam to separate the electrodes. Means are provided for reversibly connecting the two electrodes in alternate sequence in a circuit which is connected to a source of current. During operation of the coulometer, the second electrode is alternately converted to substantially fully charged (reduced) and discharged (oxidized) conditions. The liquid amalgam maintains a supply of available, electrochemically active cadmium material at the liquid surface of the electrode on each anodic and cathodic cycle for the second electrode. The relatively small capacity of the second electrode relative to the first electrode then cooperates with the liquid surface characteristic of the second electrode so that the relative surface areas of the electrodes and the current density therebetween are maintained substantially constant from cycle to cycle. Also disclosed is electrical timing apparatus comprising the source of current, a resistor having a resistance which is a function of its temperature, and a current-integrating device, such as the coulometer. Means are connected to the coulometer for signalling when the second electrode has reached a preselected charge or discharge level. Means are provided for interconnecting the current source and the resistor in a circuit with the reversible coulometer. Shunt connected across the coulometer electrodes is a voltage limiter which limits the rise of voltage across the coulometer to a level below that at which hydrogen evolution will take place in the coulometer. The length of time for the signalling device to indicate the coulometer has reached a preselected charge or discharge level after reversing the sequence of connection of the electrodes with respect to the current source is a function of both time and temperature.

PATENTED OCT 12 1971 3,613,002

George Trenkler
Inventor.

COULOMETER AND TIMING APPARATUS

Current-integrating devices such as capacitors or coulometers have recognized utility as timing devices. The principle utilized with respect to a coulometer is that the amount of chemical change produced by an electrical current through an electrochemical cell is directly proportional to the product of the magnitude of the current and the time for which it is passed. In other words, the amount of chemical change produced by passage of an electrical current is directly proportional to the quantity of electricity or coulombs passed. It is advantageous for the current integrator of the timing device to be reversible and not have to be reconditioned before it can be reused. The time required to pass a given amount of change must be reproducible in either direction in order that the device may be used to measure time consistently and repetitively.

Where time periods of a few seconds to a few minutes are to be measured, relatively high current densities are involved. Coulometers as described in this invention are particularly desirable as current-integrating devices for timers of this type as the surface area of the control electrode remains constant in itself and remains constant relative to the other electrode so that relative electrode surface area and current density are not variable factors in the coulometer. Instead, the magnitude of the current flowing through the coulometer determines the length of the period measured by the coulometer. Conventional coulometers are not able to handle the current densities required for such timing periods and permit rapid recycling. That is, if conventional coulometers are used in such timers and they are recycled (i.e., charged repetitively with alternate polarity connections), the relative electrode surface areas and the current density between the electrodes will change from cycle to cycle and inaccurate timing will result.

It would also be advantageous for certain important uses if such timers would provide a timing period which is a function of temperature. For example, in the well-known "Polaroid" cameras the time required to develop the photographic print is a function of temperature and if the ambient temperature is high a shorter development time is necessary. Thus, it would be desirable for this and other uses to have a timer that provides a signal at the end of a predetermined time period under given temperature conditions, but would automatically shorten or lengthen this time period as a function of increased or decreased ambient temperature.

Among the several objects of this invention is the provision of a reversible electrochemical coulometer which will handle relatively high current densities for timing cycles of a few seconds to a few minutes and will accurately and reproducibly time such periods during immediately sequential repetitive alternate cycles and not drift from cycle to cycle; the provision of electrodes for a reversible coulometer which provide a substantially constant current density from cycle to cycle; the provision of timing apparatus wherein the period timed is a function of temperature; the provision of switch apparatus for reversible coulometers and the like which provides a unidirectional action in alternately connecting a coulometer in opposite polarity modes; and the provision of compact, economical and reliable timing apparatus. Other objects and features will be in part apparent and in part pointed out hereinafter.

Briefly, the present invention is directed to a reversible coulometer wherein each electrode alternates between functioning as an anode and as a cathode on alternate cycles. The coulometer includes a container and a liquid alkaline electrolyte in the container. A first electrode is in contact with the electrolyte and comprises an inert support and a solid active cadmium-containing material. A second control electrode is provided which comprises a liquid cadmium amalgam containing not more than about 1 percent cadmium. The second electrode preferably has an electrochemical energy storing capacity corresponding to about 1 percent of the capacity of the first electrode. A layer of dielectric material, permeable by the electrolyte and impermeable by the amalgam, is in contact with the electrolyte and with the amalgam to separate the electrodes. Means are provided for reversibly connecting the two electrodes in alternate sequence to 66 source of current whereby during operation of the coulometer the active material on the second electrode is alternately converted to substantially fully charged (reduced) or discharged (oxidized) condition. The liquid amalgam maintains a supply of available electrochemically active cadmium material at the surface thereof on each anode and cathode cycle for the second electrode. The relative small capacity of the second electrode relative to the first electrode then cooperates with the surface characteristic of the second electrode so that the surface areas of the electrodes and current density therebetween are maintained substantially constant form cycle to cycle.

Another aspect of this invention is electrical timing apparatus including a source of current, a resistor which has a resistance which varies as a function of its temperature, and a current-integrating device such as the reversible coulometer. Means are connected to the current-integrating device for signalling when the current-integrating device has reached a preselected charge or discharge level. Means are provided for interconnecting the current source and the resistor in a circuit with the integrating device whereby the length of time for the signalling device to indicate that the integrating device has reached a preselected charge or discharge level is a function of both time and temperature.

In the accompanying drawings, in which several of various possible embodiments of the invention are illustrated, FIG. 1 is a longitudinal section of a reversible coulometer according to this invention;

Corresponding reference characters indicate corresponding parts throughout the several views of the drawings.

Figure 1:
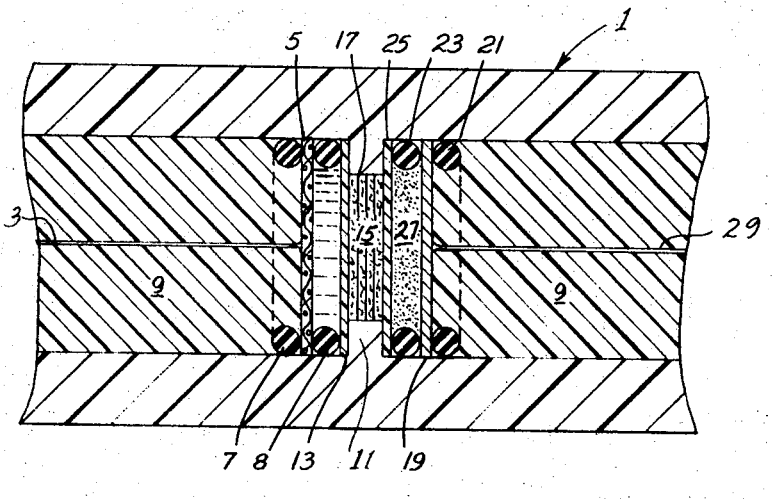

Referring now to the drawings, particularly FIG. 1, a reversible coulometer container of an electrically nonconductive material in the form of a hollow cylinder is indicated generally at reference numeral 1. Extending from one end of container 1 is a lead wire or terminal connection 3 which is mechanically secured and electrically connected at its inner end to a first disk-shaped electrode 5. This electrode is fabricated of a nickel wire mesh plaque to which nickel carbonyl powder has been sintered, made, for example, in the manner disclosed in U.S. Pat. No. 3,393,096. The nickel plaque material is then immersed in cadmium nitrate solution to fill its pores and is placed in a hydroxide solution to precipitate cadmium hydroxide in situ within the plaque pores.

An O-ring 7 is seated on one side of electrode 5 to peripherally seal it in a coaxial position within the bore of the cylindric container 1. Electrode 5 is backed by a sealing plug or filler 9 of any conventional potting compound 9, such as formed from epoxy resins and the like. A central portion 11 of cylinder 1 necks inwardly to provide a reduced-diameter portion. An O-ring 8 is interposed between the other side of electrode 5 and a disk-shaped layer 13 of an electrolyte-permeable dielectric material thereby sealing the peripheral edges of both relative to each other and the shoulder formed at one side of the reduced-diameter portion 11. A suitable dielectric material for layer 13 is pressed cellulose fibers such as is commonly known as "sausage casing" The space between electrode 5 and sausage casing layer 13 is filled with an alkaline electrolyte 15 such as potassium hydroxide. An aqueous solution of 30 percent potassium hydroxide by weight or 6.9M concentration is particularly effective as the electrolyte.

Reduced-diameter portion 11 of container cylinder 1 is filled with layers of another electrolyte-permeable dielectric material 17. A material particularly useful for this is nylon felt such as is available under the trade designation "Pellon." These layers are saturated with electrolyte 15.

Another electrically conductive electrolyte-inert metallic support disk 19 of nickel or cadmium-plated nickel, for example, is positioned within the bore of container 1 and peripherally sealed on both sides by two other O-rings 21 and 23. The inner (or left as viewed in FIG. 1) surface of electrode disk 19 is spaced from another electrolyte-permeable layer 25 of sausage casing and sealed peripherally relative thereto by O-ring 23. The space between the opposing surfaces of disk 19 and layer 25 is filled with a body of a liquid cadmium amalgam 27. In an alternate construction within the scope of this invention, the body of liquid amalgam can be replaced with a thin film of the amalgam adhered to all surfaces of an acrylic polymer disc or the like to facilitate retention of the liquid amalgam between the disk 19 and the layer 25.

The amalgam desirably contains not more than 1 percent by weight of cadmium of preferably from one-half to 1 percent by weight of cadmium. The cadmium used in 99.999 percent pure. The mercury is triple distilled for high purity. The materials are combined by cutting a sheet of the cadmium into small pieces and mixing the small pieces with the mercury in an inert atmosphere such as nitrogen. The cadmium particles are completely dissolved in the mercury without any difficulty to form a true alloy. Disk 19 and the body of liquid cadmium amalgam 27 constitute the second electrode of this coulometer 1.

The electrolyte-permeable, amalgam-impermeable, dielectric material layer 25 separates the amalgam 27 from electrolyte 15 in the central portion 11 of the container 1 and also retains the amalgam 19 in surface contact with the support disk 17. Disk 19 is backed and sealed by filling the remaining bore portion of container 1 with potting compound 9. A lead wire or terminal connection 29 is connected to electrode disk 17 and extends through the infilling of potting compound 9.

It is to be understood that the electrolyte-permeable layers 13, 17 and 25 permit free migration of the hydroxyl ions while preventing the passage of the amalgam, the cadmium hydroxide, and metal particles which otherwise would tend to form dendrites during coulometer cycling. The reversible electrochemical reaction which takes place at the cadmium amalgam electrode is represented as:

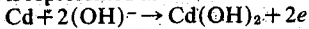

while the reaction at the cadmium hydroxide impregnated electrode is represented as:

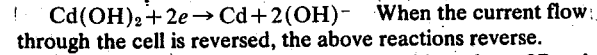 When the current flow through the cell is reversed, the above reactions reverse.

The second electrode formed by the liquid amalgam 27 and the disk 19 are preferably proportioned so that the second electrode has an electrochemical energy storing capacity corresponding to about 1 percent of the electrochemical energy storing capacity of the first electrode 5. However, the second electrode can also have a much larger capacity relative to the first electrode, up to about 20 percent of the first electrode capacity, within the scope of this invention. The first electrode 5 is preferably provided with its active cadmium material in partly charged (reduced) condition and in partly discharged (oxidized) condition, the preferred arrangement of the electrode 5 having about one-half of its active material in each of said conditions.

Figure 2:
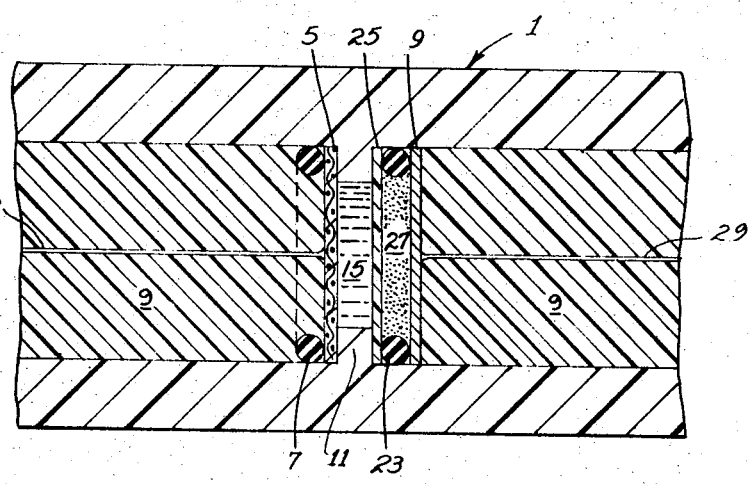
FIG. 2 is a longitudinal section of an alternate construction of a reversible coulometer of this invention.

An alternate reversible coulometer construction is shown in FIG. 2 wherein like numbers have been used for like parts. In the construction shown here the layer 13 and O-rings 8 and 21 have been eliminated and electrode disk 5 is seated directly against the left shoulder formed by the reduced-diameter central portion 11 of container 1. Similarly, the nylon felt layers 15 have been eliminated, the necked in central portion 11 being filled with the same electrolyte 15 as before. This construction has also been found to be quite satisfactory.

Figure 3:
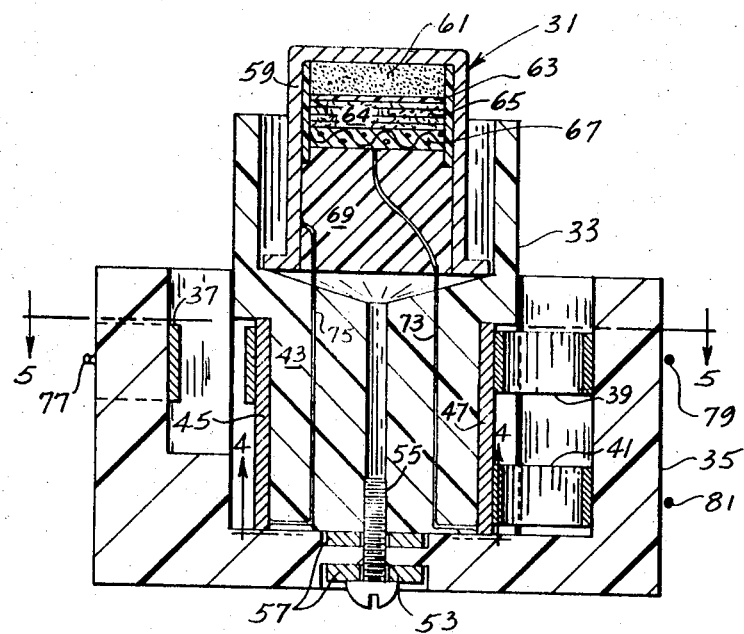
FIG. 3 is a section of another alternate construction of a reversible coulometer and switching apparatus therefor as taken on line 3—3 of FIG. 5.
Figure 4:
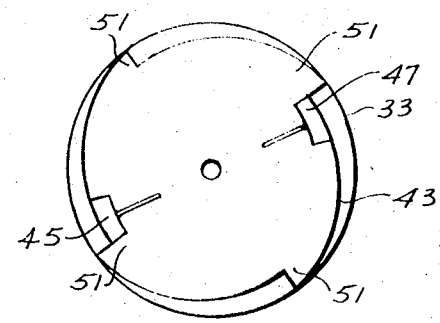
FIG. 4 is a bottom plan of a rotor of the FIG. 3 switching apparatus as viewed on line 4—4 of FIG. 3.
Figure 5:
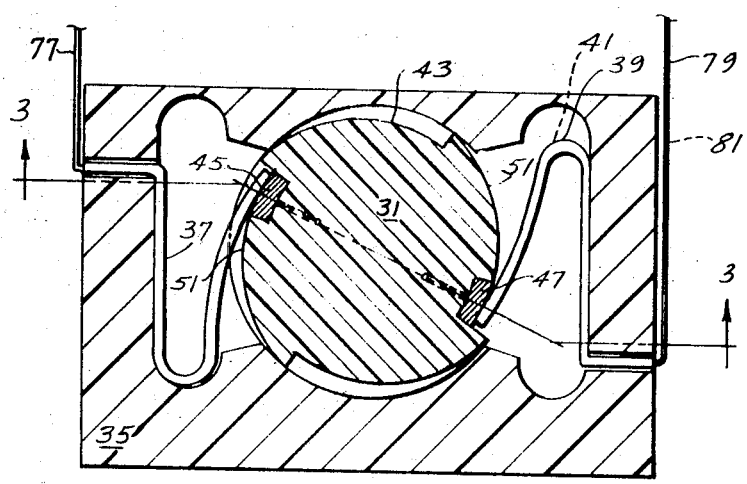
FIG. 5 is a section of the FIG. 3 reversible coulometer switching apparatus taken on line 5—5 of FIG. 3.

Referring now to FIGS. 3–5, another embodiment of a reversible coulometer is indicated generally at numeral 31. This coulometer is mounted within the recessed end of a cylindrical rotor 33 of insulating material. This rotor is mounted for rotation around its central axis within an insulating base 35 provided with three identical resilient metal contact fingers 37, 39 and 41 that have their free ends biased, as shown in FIG. 5, into wiping engagement with a lower portion 43 of rotor 33 so that contact finger 37 contacts the lower rotor portion 43 at an area 180° displaced from the lower rotor portion contacted by the ends of contact fingers 39 and 41. Inset into opposite surfaces of lower rotor portion 43 are two elongate metal contacts 45 and 47. As illustrated more particularly in FIG. 4, the lower portion 43 has four ratchet teeth 51 positioned at 90° intervals around its peripheral surface. The rotor is retained in base 35 by a machine screw 53 threaded into a threaded bore 55 of rotor 33. A pair of bearing washers 57 provide for rotation of rotor 33 within base 35.

The free ends of contact fingers 37, 39 and 41 also constitute pawls which permit rotation of rotor 33 in one direction (clockwise as shown in FIG. 5) but restrain rotation in the other direction. It is to be understood that other pawl means, separate from the contact fingers, may be utilized instead of employing the contact fingers for the double function of current carrying and providing pawl action relative to the ratchet teeth 51.

Coulometer 31 has as its container a flanged metal cup 59, such as is typically used for transistors and other solid state devices. A first electrode 61 of a liquid cadmium amalgam, as described previously, is retained in the upper portion of container 59 by a layer 63 of electrolyte-permeable, amalgam-impermeable dielectric material, such as sausage casing. Immediately below layer 63 is a separator layer 65 of felted nylon, as described above, and which contains the alkaline electrolyte 64. A second electrode 67 constituted, e.g., by a nickel mesh disk and a sintered active cadmium-containing material, similar to electrode 5 of FIGS. 1 and 2, is held in position and sealed by potting compound 69. An insulating liner 71 of electrolyte-impermeable dielectric material is provided around the inner surface of cup 59 to insulate electrode 67 from cup 59 which is electrically common with the amalgam electrode 61. Conductive leads 73 and 75 interconnect these coulometer electrodes 67 and 61 with contacts 47 and 45 respectively.

The switch apparatus of FIGS. 3–5 has conductive leads 77, 79 and 81 connected respectively to the supported ends of contact fingers 37, 39 and 41. These leads provide for interconnection of coulometer 31 and the switch apparatus with other circuit components of electrical timing apparatus of this invention as exemplified by the schematic circuit diagrams of FIGS. 6–8. As illustrated more particularly in FIG. 6, such timing apparatus includes a battery 83 as a source of direct current connected with a thermistor 85 and the electrodes of coulometer 31 via the switch apparatus by leads 77 and 79. The resistance of thermistor 85 varies as a function of temperature, and for example, may have a negative thermal coefficient of resistivity if it is desired that the period being timed be shortened as a function of increasing temperature.

Also, series connected with battery 83 via leads 79 and 81 and the switch apparatus is the collector-emitter circuit of a transistor 87 and an incandescent lamp 89 which serves as a means for signalling when the coulometer has reached a preselected charge level. The base of transistor 87 is connected by means of a diode 91 and lead 77 to contact finger 37. Shunt connected across contact fingers 45 and 47 is a clamping diode 93 which serves as a means for limiting voltage developed across coulometer 31. In the preferred timer construction illustrated, the transistor 87 and the diode 91 are of the germanium type while the clamping diode 93 is of the silicon type, these preferred components having the voltage, current and junction characteristics to perform their desired functions in the illustrated circuits at the voltage levels provided by the reversible cadmium coulometer 31. However if desired, other diode and transistor types can also be used in the described circuits if additional circuit components are employed in known manner to modify the circuit characteristics within the scope of this invention.

When it is desired to initiate a timing cycle rotor 43 of the switch apparatus is moved to a position in which contact finger 37 contacts one of the contacts 45 or 47 and the other contact fingers 39 and 41 simultaneously contact the other contact. Current will then be supplied to coulometer 31 and a charging cycle begins during which coulometer 31 integrates the current supplied. Assuming typical conditions and parameters with battery 83 having a potential of 1.35 volts and with the liquid amalgam electrode in oxidized condition, the voltage across the coulometer 31 will remain at a relatively low level, e.g., about 0.12 volts until the liquid amalgam electrode is substantially fully reduced and the coulometer is substantially fully "charged" (approximately the last 5 percent of its cycle), whereupon the voltage across the coulometer will sharply rise to a level of about 1.2 volts. However, as will be discussed hereafter, this voltage rise is limited to about 0.6 volt by the clamping action of diode 93. If the liquid amalgam electrode had been in fully reduced condition at the initiation of the timing cycle, the voltage across the coulometer would have remained at the 0.12-volt level until the liquid amalgam electrode had been substantially fully oxidized, at which time the voltage across the coulometer would have risen toward the 1.2-volt level.

During the charging cycle, the low voltage across the coulometer 31 is insufficient to overcome the potential drop on the base-emitter junction of transistor 87 and the diode 91. Thus transistor 87 will not be biased into conductance until the voltage across coulometer 31 rises to about 0.5 volt at which level diode 91 and the base-emitter junction of the transistor 87 will become conductive and will turn on transistor 87, thereby energizing lamp 89. As the charging time of coulometer 31 is determined by the voltage of battery 83, the internal resistances of the battery and coulometer, and the resistance of thermistor 85, any change in the temperature of thermistor 85 will vary the total resistance in the circuit. Thus the time interval required to charge the coulometer and bias transistor 87 into conductance so as to energize lamp 89 primarily is a function of the temperature of thermistor 85. The limiting of the coulometer voltage by clamping diode 93 prevents the evolution and buildup of hydrogen gas on the coulometer electrodes which would otherwise occur at higher voltages, such as over 1.0 volt, to which the coulometer would rise unless limited. Such hydrogen evolution would render the coulometer cell irreversible. After the signalling device has been energized by the coulometer's reaching its preselected charge level, the switch rotor 43 is moved 90° clockwise (FIG. 5) to an intermediate position whereupon the contact fingers 37, 39 and 41 are out of contact with contacts 45 and 47 and the latter two contact fingers are spaced and insulated from each other. This removes the coulometer 31 from the circuit with battery 83 and also disconnects the emitter of transistor 87 from the coulometer and the battery. Another timing cycle can be initiated only by rotating the rotor 90° further clockwise (FIG. 5) as the ratchet-pawl action permits only unidirectional action of the rotor. In this position the coulometer is connected in an opposite polarity mode relative to that previously described and shown in FIGS. 3-6. The electrochemical reactions at the electrodes are then reversed as discussed above and another timing cycle takes place. Further 90° rotation of rotor 43 to a second intermediate position again opens the circuits between the battery, coulometer and transistor emitter. Thus, as the rotor of this unidirectional switch is rotated it moves from a first closed circuit position to an open circuit position and then to a second closed circuit position in which the coulometer is connected to the battery in a polarity mode opposite from that of the first closed circuit position, and then finally to a second open circuit position. A rapid sequence of repetitive timing cycles can be carried out and because of the substantially constant current density characteristics of this coulometer cell the accuracy and reproducibility of the timed intervals are excellent. As this switching apparatus and coulometer are compact, and the switching action is unidirectional and provides rapid sequencing of timing cycles, they may be incorporated advantageously in a "Polaroid" camera with the rotor linked or geared to the film pullout rollers and mechanism to time the film development periods, automatically compensating for temperature variations and supplying an indication signalling the end of each such temperature-compensated time period.

An exemplary timing apparatus such as described has the following characteristics and parameters: The diameter of coulometer 31 is 0.8 cm. with the sintered counter electrode 67 having approximately 25 ma. hr. capacity. The cadmium-amalgam electrode 61 has approximately a 0.25 ma. hr. capacity and remains liquid over the usual ranges of ambient temperatures. The current densities for 1-minute timing cycles are on the order of 30 ma./cm.$^2$ on electrodes 61 and 67. This amalgam electrode 67 provides a signal level of at least 0.5 volts on both the hydrogen and oxygen cycles.

Presently available thermistors have a thermal coefficient of resistivity such that typically the maximum change in resistance per degree temperature change is about 4 percent. As there may be fields of use where this timing apparatus desirably should have a greater or enhanced sensitivity or response to temperature change, two further timing apparatus circuits are disclosed in FIGS. 7 and 8 which provide increased values of resistance change per degree temperature variation.

Figure 6:
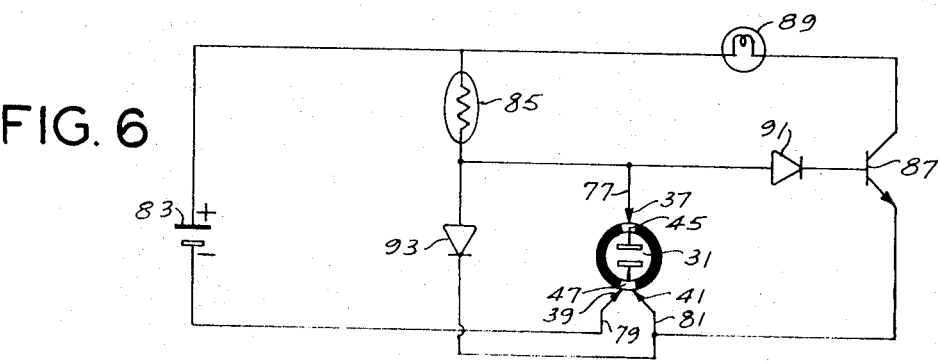
FIG. 6 is a schematic diagram of an electrical timing apparatus useful in the practice of this invention.
Figure 7:
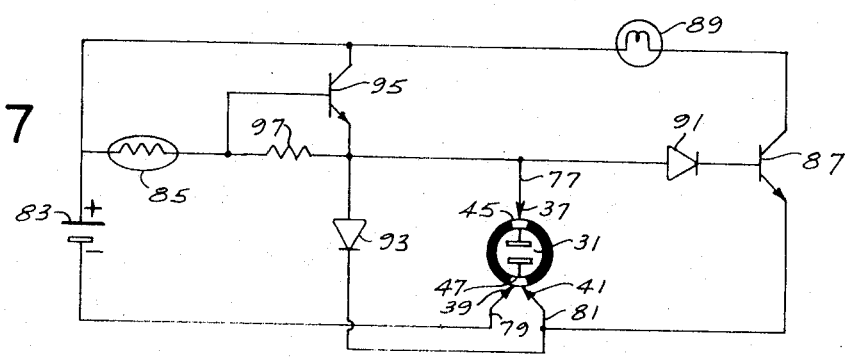
FIG. 7 is a schematic diagram of an alternate circuit of electrical timing apparatus.

The FIG. 7 circuit is similar to that of FIG. 6 except that a transistor 95 has its output or collector-emitter circuit connected in the charging current circuit in place of the resistance of thermistor 85. This thermistor and a resistor 97 are series connected across the collector-emitter circuit of transistor 95. The base of this transistor is connected to the junction between thermistor 85 and resistor 97. Any temperature-induced variation in the resistance of thermistor 85 will change the bias and vary the conductivity of transistor 95, thus changing the resistance of the circuit interconnecting the battery 83 and coulometer 31 at a greater rate per degree temperature change than that of thermistor 85.

Figure 8:
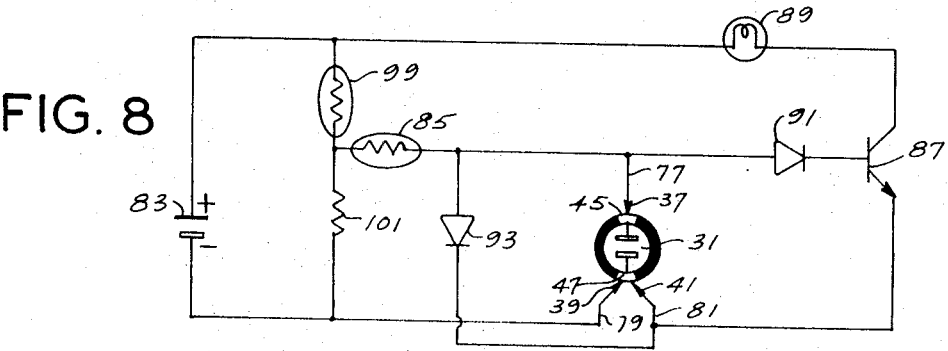
FIG. 8 is a schematic diagram of another circuit of electrical timing apparatus.

Another means for increasing the thermal response of the timing apparatus is illustrated in FIG. 8. Another thermistor 99, also of negative temperature coefficient where the thermistor 85 is of negative temperature coefficient, is series connected in the coulometer charging circuit with thermistor 85. Connected between the junction of these thermistors and the negative terminal of battery 83 is a resistor 101. Thermistor 99 and resistor 101 constitute a voltage divider connected across battery 83 with the voltage at the junction therebetween being a function of the rate of thermally induced change of the resistance of thermistor 99. When temperature increase occurs, voltage at the junction between the thermistors 99 and 85 increases due to lowering of the resistance in the upper half of the voltage divider. The potential drop between the junction of the thermistors and the junction between thermistor 85 and the diode 93 then also increases directing increasing current through thermistor 85. At the same time, thermistor 85 decreases in resistance in response to the same temperature change which effected thermistor 99. The combined change in resistance in the coulometer circuit in response to the temperature change is thus much greater with the two thermistors arranged in this manner than could be achieved with either thermistor alone.

It will be understood as discussed above that although coulometers have certain advantages over capacitors as current integrating devices in the timing apparatus of this invention, capacitors may be used for this purpose. Also, it should be noted that signalling means other than an electrically energized light source may be advantageously used, e.g., an electromagnetic device such as a relay or solenoid which is energized when the current integrating device reaches its preselected charge level.

In view of the above, it will be seen that the several objects of the invention are achieved and other advantageous results attained.

As various changes can be made in the above constructions, without departing from the scope of the invention, it is intended that all matter contained in the above description or shown in the accompanying drawings shall be interpreted as illustrative and not in a limiting sense.

What is claimed is:

1. Electrical timing apparatus comprising;
    a source of direct current;
    a resistor which has a resistance which varies as a function of its temperature;
    a coulometer;
    means connected to the coulometer for signalling when the coulometer has reached a preselected charge level;
    means for interconnecting said current source and said resistor in a circuit with said coulometer whereby the length of time for the signalling device to indicate the coulometer has reached a preselected charge level is a function of both time and temperature; and
    voltage-limiting means shunt connected across said coulometer electrodes whereby the rise of voltage across the coulometer is limited to a predetermined level below that at which hydrogen evolution will take place in the coulometer.

2. Electrical timing apparatus as set forth in claim 1, wherein the coulometer comprises a first electrode of a solid active cadmium-containing material and a second electrode comprising a liquid cadmium amalgam containing not more than about 1 percent cadmium by weight.

3. Electrical timing apparatus as set forth in claim 2 wherein said second electrode has an electrochemical energy storing capacity corresponding to about 1 percent of the electrochemical energy storing capacity of said first electrode.

4. Electrical timing apparatus as set forth in claim 1 wherein the voltage-limiting means comprise clamping diode means.

5. Electrical timing apparatus as set forth in claim 4 wherein said clamping diode means comprises a germanium-type diode.

6. Electrical timing apparatus as set forth in claim 4 wherein the signalling means includes transistor means having an output circuit adapted to become conductive upon the coulometer reaching the preselected charge level.

7. Electrical timing apparatus as set forth in claim 6 wherein said transistor means comprises a germanium-type transistor.

8. Electrical timing apparatus as set forth in claim 6 wherein the signalling means further includes an electrically energizable light source connected in the output circuit of said transistor.

9. Electrical timing apparatus as set forth in claim 6 which includes further diode means interconnected between the base of said transistor and said coulometer.

10. Electrical timing apparatus as set forth in claim 9 wherein said further diode means comprises a germanium-type diode.

11. Electrical timing apparatus as set forth in claim 9 wherein the means for interconnecting the current source and resistor with said coulometer device includes a rotary switch having two open circuit positions alternating with two closed circuit positions, said first and second closed positions respectively interconnecting the current source through said resistor to said coulometer in opposite polarity modes, said switch including means for permitting actuation of said switch in one rotational direction only.

12. Electrical timing apparatus as set forth in claim 1 which includes means connected with said resistor for increasing the effective thermal response thereof.

13. Electrical timing apparatus as set forth in claim 12 wherein said means for increasing the thermal response includes a transistor having its collector-emitter circuit connected in series with said current source and said coulometer, the temperature response resistor and another resistor being series connected across the collector-emitter circuit of the transistor, and the base of the transistor is connected to the junction between said resistors whereby the resistance of the circuit interconnecting the current source and the coulometer is varied at a greater rate per degree temperature change than that of the temperature.

14. Electrical timing apparatus as set forth in claim 12 wherein means for increasing the thermal response includes a second resistor also having a resistance which varies as a function of temperature, the first said and the second resistors being series connected between said current source and said coulometer, and another resistor interconnecting a junction between the first said and second resistors to the current source, this resistor and the first said resistor comprising a voltage divider connected across the current source whereby the resistance of the circuit interconnecting the current source and the coulometer is varied at a greater rate per degree temperature change than that of the temperature-responsive resistor.

15. Switch apparatus for a reversible coulometer comprising:
    a generally cylindrical rotor having at least two ratchet teeth symmetrically positioned on opposite sides of a diametrical plane thereof;
    first and second contacts on opposite sides of said rotor;
    a reversible coulometer carried by said rotor and having two electrodes respectively connected to said contacts;
    a base receiving said rotor for rotation about the central axis thereof;
    first and second contact fingers carried by said base and having ends biased into engagement with opposing sides of the rotor whereby upon rotation of the rotor in one direction about its axis within said base the first and second contact fingers respectively engage the first and second contacts in one position thereof and engage respectively the second and first contacts in a second position thereof and at intermediate rotor positions the contact fingers are out of contact with said contacts; and
    pawl means on said base engageable with said ratchet teeth whereby rotation of the rotor in an opposite direction is restrained.

16. Switch apparatus as set forth in claim 15 wherein said contact fingers constitute said pawl means.

17. Switch apparatus as set forth in claim 16 wherein the rotor includes four ratchet teeth positioned at 90° intervals about the rotor surface whereby there are two alternate intermediate positions wherein the contact fingers are held out of contact with said contacts.

18. Switch apparatus as set forth in claim 17 which includes a third contact finger spaced and insulated from said second contact finger and having an end adapted to contact the same contact simultaneously with said second contact finger in said first and second rotor positions whereby in these latter two positions said second and third contact fingers are electrically common with one of said rotor contacts and in the intermediate positions said second and third contact fingers are out of contact with both rotor contacts and with each other.